United States Patent [19]
Horowitz

[11] 4,215,514
[45] Aug. 5, 1980

[54] AIR PLANT SUPPORT DEVICE

[76] Inventor: Alvin E. Horowitz, 2320 SW. 23rd Ave., Miami, Fla. 33145

[21] Appl. No.: 949,902

[22] Filed: Oct. 10, 1978

[51] Int. Cl.² .................. A01G 31/00; A01G 9/02
[52] U.S. Cl. ........................................................ 47/67
[58] Field of Search ................................ 47/66–67, 47/41.12, 41

[56] References Cited
U.S. PATENT DOCUMENTS

| | | | |
|---|---|---|---|
| 3,818,633 | 6/1974 | Sable | 47/67 |
| 3,958,365 | 5/1976 | Proctor | 47/66 |

*Primary Examiner*—Robert E. Bagwill
*Attorney, Agent, or Firm*—Ernest H. Schmidt

[57] ABSTRACT

A formed wire frame has secured against each side thereof a quantity of sphagnum moss of generally circular configuration one side of which is formed with shallow depression for the interfitting reception of the base of an air plant to be supported for growing. The frame has peripherally outwardly projecting loop portions to which hooks are attached for hangingly supporting or anchoring the assemblage after an air plant has been attached thereto for growing into the sphagnum moss. The sphagnum moss and plant are secured in place by an enveloping fabric sack having a draw-string adjustable opening for marginally securing the base of the plant in place.

2 Claims, 3 Drawing Figures

AIR PLANT SUPPORT DEVICE

This invention relates to air plants and is directed particularly to a holder for conveniently and attractively supporting and growing staghorn ferns, elkhorn ferns, and the like.

Heretofore in the commercial growing and propagation of air plants such as elkhorn ferns and staghorn ferns it has been customary to remove growing pups from adult plants and individually attach them to pieces of wood bark or the like to support them until they take root by themselves. This process is tedious, requires a great deal of skill, and uses materials not usually readily available to the householder who wishes to grow decorative air plants. It is, accordingly, the principal object of this invention to provide a novel and improved air plant support device that can be used by both the home gardner and the commercial plant nursery, and which will simplify and standarize the support means for growing air plants.

A more particular object of the invention is to provide an air plant holder of the above nature having an inexpensive bent wire frame used as the basic supporting framework, to each side of which is secured a circular portion of sphagnum moss used as the plant attaching medium, and in one side of which is formed a shallow, circular depression against which the base of an air plant can be temporarily secured until the plant takes root in the sphagnum moss.

Yet another object of the invention is to provide an air plant support device of the character described wherein the bent metal support framework comprises a plurality of loop or lobe portions to be used as hanging means by the use of hooks extending therethrough, for example, for supporting and/or anchoring an air plant holder assemblage in an appropriate location for display. Since the hooks are spaced around the support device, they are well suited to use for attachment to a tree trunk or tree branch for example, or to attachment to a wall as one would a picture, or for support between vertical posts and the like.

Yet another object of the invention is provide an air plant holder of the above nature of such size, shape, and consistency as to lend itself to being entirely enveloped by the root base system of a supported air plant during its continued growth, thereby eventually resulting in a hanging plant in which the supporting structure will be completely consumed and hidden from view, with the attachment loops being still available to allow removal for attachment to another place.

Still another object of the invention is to provide an air plant holder of the above nature wherein an enveloping fabric sack of burlap or the like is used to retain the sphagum moss and air plant to be mounted in place until it roots by itself, the fabric sack having an opening to receive the wide base of the plant, and which opening is of adjustable size by use of a draw string for marginally covering and securing the plant base in place.

Yet other objects are to provide an air plant holder which will be simple in construction, inexpensive to manufacture, attractive in appearance and durable in use.

Other objects, features and advantages of the invention will be apparent from the following description when read with reference to the accompanying drawings. In the drawings, wherein like reference numerals denote corresponding parts throughout the several views.

Figure 1:
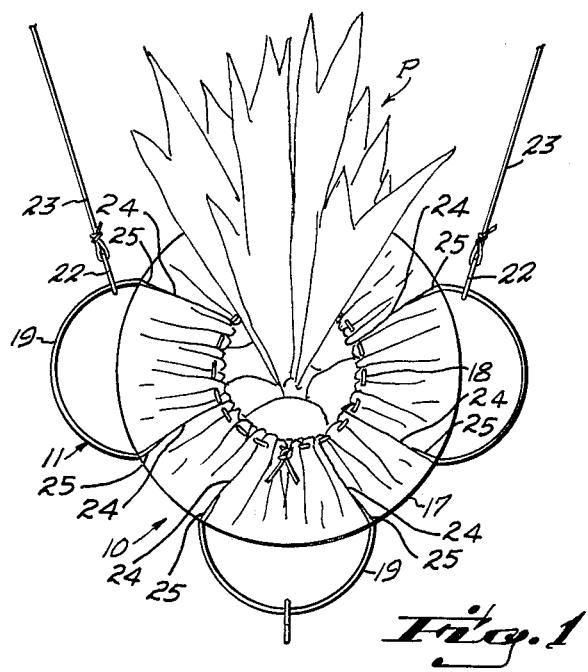
FIG. 1 is a front elevational view of an air plant support device embodying the invention, shown with a staghorn fern rooted therein.
Figure 2:
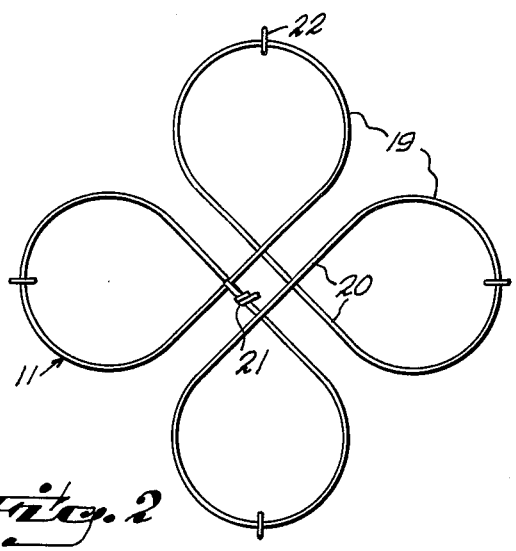
FIG. 2 is a plan view of the wire supporting frame, shown separately.
Figure 3:
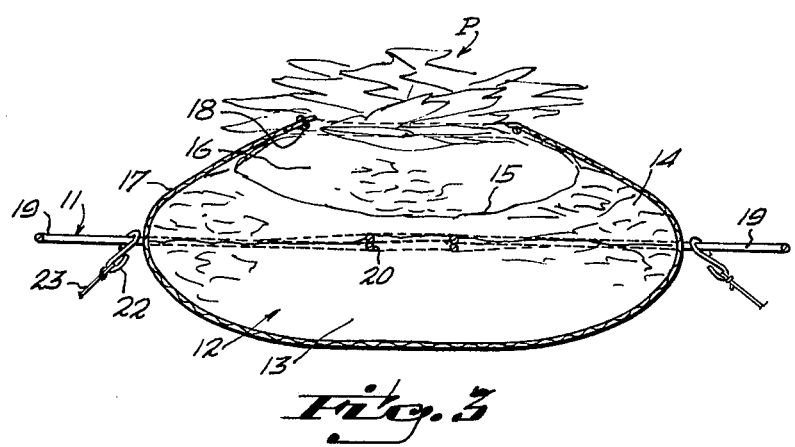
FIG. 3 is a transverse cross-sectional view of the air plant support device illustrated in FIG. 1.

Referring now in detail to the drawings, reference numeral 10 designates generally an air plant holder embodying the device, shown as in use with a staghorn fern P attached and rooted thereto, the assemblage being supported from above by wires or cords 23, for example. The air plant holder comprises a supporting frame 11 which, as is best illustrated in FIG. 2, may be formed of bent wire for example. Preferably, the frame wire will be bent of a single length of wire to provide straight portions 20 extending into a plurality of loops 19 all in a substantially common plane. Four loops symmetrically arranged in the likeness of a four-leaf clover for example, as illustrated, provides firm support for air plant holders of various diameters of practical size. The four lobes of the framework, moreover, provide anchor means for like number of supporting hooks 22 used for hanging or otherwise supporting the air plant holder as with attachment wires or cords 23. As best illustrated in FIG. 3, the supporting frame 11 has attached to the front and back thereof generally circular masses of sphagnum moss indicated at 14 and 13, respectively. A cover sack 17, which will preferably be fabricated of coarse fabric such as burlap, encloses the back mass of sphagnum moss 13 and extends partially over the front mass 14 to terminate in a central opening the marginal periphery of which is stitched with a draw-string 18. With reference to FIG. 1, it will be seen that the front opening portion of the fabric sack is radially slit from its periphery to the zones of passage around and through the wire loops. These slits are illustrated not only by the full lines 24 extending from the loop wire portions to the gathered material at the central opening, but also by elongated open zones 25 at the inner ends of the slits where they pass around these wire loop portions. The draw-string 18 can be pulled tight, and tied, as illustrated, to support the base 16 of the air plant P in place until it can attach itself independently. As illustrated in FIG. 3, the front mass of sphagnum moss 14 will preferably be formed with a central depression 15 for the complemental fitting thereagainst of the rounded base of the air plant P being supported.

As illustrated in FIGS. 1 and 3 the four loops of the supporting wire frame project outwardly beyond the periphery of the sphagnum moss assembly and have attached thereto the above described supporting hooks 22.

In use, the base of an air plant P, which may be a staghorn fern for example, will be seated in place against the depression 15 in the front mass of sphagnum moss 14, whereafter the draw-string 18 will be pulled tight and tied over a marginal outer portion of said plant base to securely retain it in place as illustrated. The supported assemblage will then be ready for hanging by means of the supporting hooks 22 as described above whereupon, under proper growing conditions, the plant will attach itself to the sphagnum moss and eventually grow and spread at its base to encompass and consume the entire front surface area of the air plant support device, even grow around to the back hereof. In so doing the supporting structure will be hidden from view, with only outer portions of the four loops 19 of the wire frame 11 projecting for hanging and support purposes. An important advantage of the invention resides in the fact that the adult plant as supported by the support device will have a most natural appearance, while at the same time being readily removable for support at other locations, as desired, without damage to the plant.

While I have illustrated and described herein only one form in which my invention can conveniently be embodied in practice, it is to be understood that this form is presented by way of example only and not in a limiting sense. My invention, in brief, comprises all the embodiments and modifications coming within the scope and spirit of the following claims.

What I claim as new and desire to secure by Letters Patent is:

1. An air plant support device comprising in combination, a substantially flat frame member, said frame member comprising a continuous length of bent wire, a quantity of sphagnum moss secured to each side of said frame member and defining together a generally circular mass of sphagnum moss, said frame member having a plurality of bent wire loops extending outwardly of the periphery of said sphagnum moss mass, said outwardly extending loop portions comprising means for interhooking engagement therewith of support members for hangingly supporting the air plant support device, said mass of sphagnum moss being substantially enclosed in a previous fabric sack, said sack having a central opening at one side of said frame member and draw-string means for tightening the opening of said sack against the sphagnum moss secured to said one side of said frame member.

2. An air plant support device as defined in claim 1 wherein the quantity of sphagnum moss secured to said one side of said frame member is formed with a shallow central depression for the interfitting reception of the base of an air plant to be supported.

* * * * *